March 9, 1965
C. DREYER ETAL
3,172,832
HYDROCARBON CONVERSION APPARATUS AND PROCESS
Filed March 16, 1962
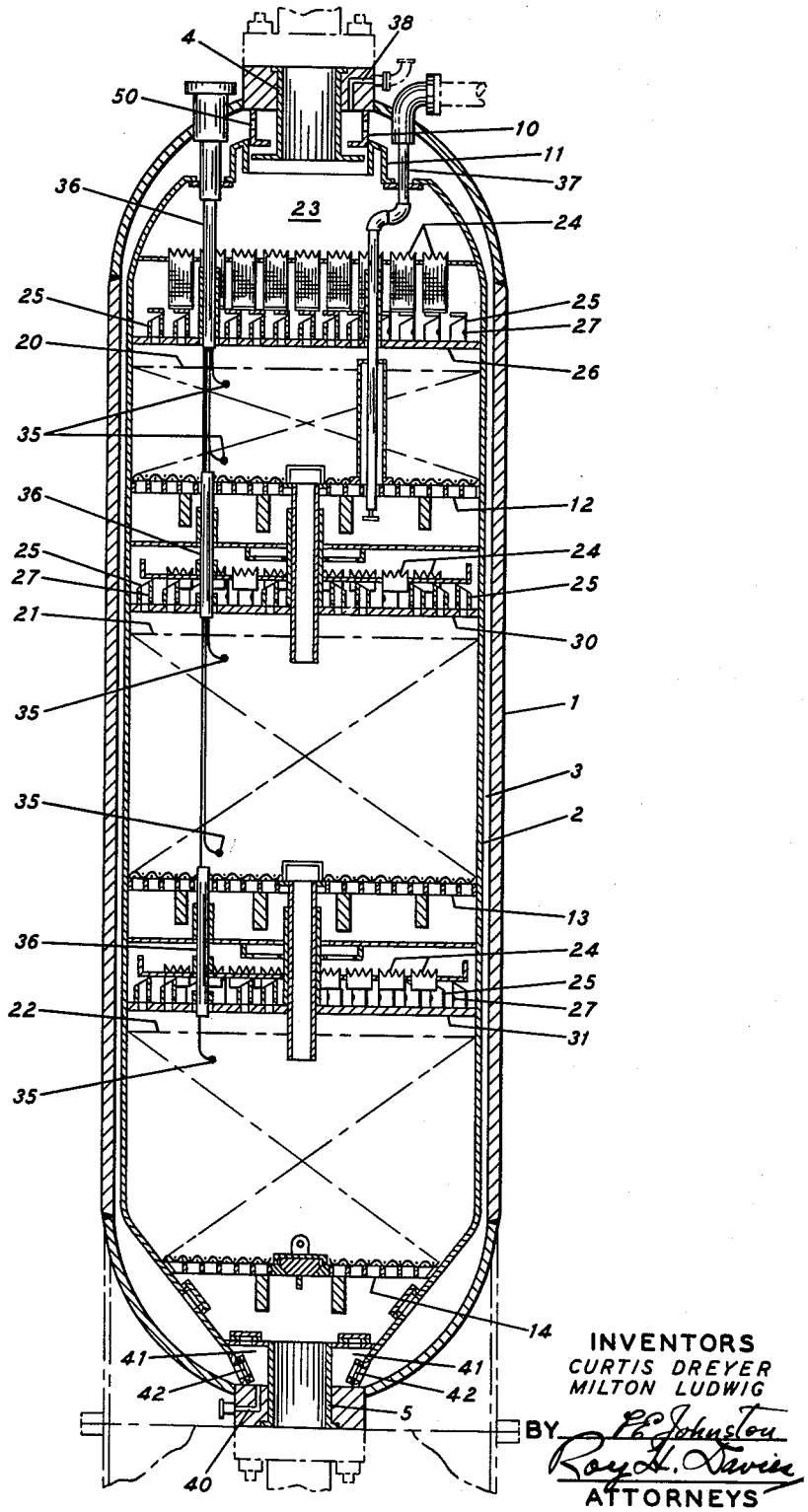
INVENTORS
CURTIS DREYER
MILTON LUDWIG
BY
ATTORNEYS

United States Patent Office 3,172,832
Patented Mar. 9, 1965

3,172,832
HYDROCARBON CONVERSION APPARATUS
AND PROCESS
Curtis Dreyer, Oakland, and Milton Ludwig, Berkeley,
Calif., assignors to California Research Corporation,
San Francisco, Calif., a corporation of Delaware
Filed Mar. 16, 1962, Ser. No. 180,267
6 Claims. (Cl. 208—47)

Introduction

The present invention relates to hydrocarbon conversion reactors and more particularly to reactors having internal liners.

Prior art

It is well known that reaction gases during reactor operation can leak into the space between the liner and the shell, thus providing a potential explosive hazard upon subsequent catalyst regeneration. This hazard can be combatted simply by purging the annulus between the liner and the shell with a purge gas after reactor shutdown and just prior to catalyst regeneration, to sweep from the annulus any potentially explosive gases that may have accumulated there.

However, a much more serious problem, and one which cannot be combatted by so simple an expedient, is the problem of attack during reactor operation of corrosive gases on the reactor materials of construction, particularly on the interior surfaces of the reactor shell. That shell frequently is constructed of a metal which is susceptible to corrosive attack by a number of hydrocarbon feed and/or reactor mix constituents. For example, hydrogen sulfide at elevated reaction temperatures is extremely corrosive to the steel with which the reactor shells conventionally are constructed.

A gas purge between the shell and liner after reactor shutdown would sweep away corrosive gases at that time, but only after the corrosion damage during reactor operation already had occurred.

Corrosion during reactor operation can be reduced to some extent by coating the interior of the shell with a layer of insulation which does not extend throughout the space between the liner and shell, or by completely filling the space between the liner and the shell with insulation. While these techniques at least partially exclude corrosive gases from the space between the liner and the shell, they are largely ineffectual because of the porosity of the insulation. The main purpose of these techniques is to lower the temperature at the interior surface of the shell, and therefore the corrosivity of the corrosive gases.

Corrosion during reactor operation can be combatted to some extent by integrally bonding a corrosion-resistant coating or cladding material, for example stainless steel in the case where the sheel is chrome steel, to the interior surface of the shell, by such techniques as roll cladding, strip lining, weld overlay cladding, etc., so that the cladding material will take the brunt of the corrosive attack of the corrosive gases. However, such bonding techniques themselves cause further hazards, particularly in that the cladding material and the shell generally have different coefficients of expansion so that each is impeded by the other in expanding and contracting freely in response to thermal changes. Accordingly, thermal changes can produce dangers of localized material stresses with consequent cracking and failure of the material. Further, in large reactors it is extremely difficult, and often impossible, to obtain from steel manufacturers clad steel in the requisite sizes without a prohibitive increase in reactor cost, generally accompanied by the loss of the steel manufacturer's guarantee.

Objects

In view of the foregoing, it is an object of the present invention to provide methods and apparatus with which corrosive attack on reactor materials of construction by corrosive gases may be avoided or at least substantially combatted.

Drawing

The present invention will best be understood, and further objects and advantages thereof will become apparent, from the following description when read in connection with the accompanying drawing, which is a sectional elevation view of an embodiment of a hydrocarbon conversion reactor constructed in accordance with the present invention and suitable for carrying out the process of the invention.

Statement of invention

In accordance with the present invention, there is provided a hydrocarbon conversion reactor comprising an elongated reactor shell and a continuous, elongated metal inner shell liner forming a reaction zone and positioned in said reactor shell to provide an annular space between said shell and said liner completely surrounding the entire outer vertical surface of said liner, said liner having one end thereof secured with respect to the nearer end of said shell and having the remaining portions thereof unsecured and free to move with respect to said shell in response to thermally-induced expansion and contraction, said shell having at one end portion thereof a hydrocarbon inlet communicating with said reaction zone and having at the other end portion thereof a reaction mix outlet also communicating with said reaction zone, purge fluid inlet means in the lower portion of said reactor for passing a non-corrosive purge fluid into said annular space and thence therethrough to prevent corrosive compounds from entering said annular space, and purge fluid outlet means in the upper portion of said liner communicating with the interior of said liner for passing said purge fluid from said annular space into the upper portion of said reaction zone.

Further in accordance with the present invention, there is provided, in a hydrocarbon conversion reactor comprising a continuous, elongated reactor shell and an elongated metal inner liner forming a reaction zone and so located within said shell as to provide an elongated annulus between said shell and said liner completely surrounding the entire outer vertical surface of said liner, and comprising a hydrocarbon inlet at an upper portion of said shell communicating with said reaction zone and a reaction mix outlet at a lower portion of said shell communicating with said reaction zone, the method of preventing attack on the interior of said shell by corrosive vapors which comprises continuously, during reactor operation, passing a non-corrosive purge fluid into said annulus, thence through at least a substantial portion of said annulus, and thence from said annulus into contact with the incoming reactor feed components.

Example of process to which invention is applicable

While the apparatus and process of the present invention are useful in combatting corrosive attack on reactor materials in many types of hydrocarbon conversion processes, including hydrocracking and catalytic cracking processes, a particular process in which such corrosive attack has been a severe problem is a hydrofining process wherein hydrocarbon feeds, for example for hydrocracking processes, are hydrofined for the removal therefrom of such contaminants as nitrogen, sulfur and metals. For purposes of clear understanding of the present invention, one such process will be described below.

It will be assumed that it is desired to hydrofine a hydrocarbon feed to a hydrocracking process, and that the hydrocracking process comprises contacting a hydrocarbon feed selected from the group consisting of hydrocarbon distillates boiling above about 200° F. and hydrocarbon residua boiling above about 1050° F. in a hydrocracking zone, in the presence of at least 1000 standard cubic feet (s.c.f.) of hydrogen per barrel of feed, with a catalyst comprising a hydrogenating-dehydrogenating component disposed on an active cracking support at a temperature of from about 400° to 900° F., a pressure of at least 500 p.s.i.g., and a liquid hourly space velocity (LHSV) of about from 0.1 to 15.0, and withdrawing from said zone at least one normally gaseous fraction and at least one normally liquid hydrocarbon product fraction. In such a hydrocracking process, the feed, as defined, may include heavy distillates normally defined as heavy straight-run gas oils and heavy cracked cycle oils, as well as conventional fluid catalytic cracker feeds and portions thereof, and the cracked stocks may be obtained from thermal or catalytic cracking of various stocks, including those obtained from petroleum, gilsonite, shale and coal tar.

Particularly where such hydrocracking feeds contain above about 0.3 p.p.m. total nitrogen, and more particularly where they contain above about 10 p.p.m. total nitrogen, it generally is extremely desirable that the feeds first be subjected to a pretreating operation that is relatively selective for the removal of nitrogen compounds. The desired low introgen levels may be reached, for example, by intimately contacting the feed stocks with various acidic media, such as $H_2SO_4$ or other liquid acids, or, in the case of feeds that are relatively low in nitrogen compounds, with such solid acidic materials as acid ion exchange resins and the like. However, it is preferred to carry out denitrification by catalytic hydrogenation (hydrofining) of the feed.

A representative hydrofining opeartion, for purposes of this example, is as follows:

The hydrocarbon feed is contacted at temperatures of from about 400° to 900° F., preferably from about 500° to 800° F., pressures of at least 300 p.s.i.g., liquid hourly space velocities of from about 0.3 to 5.0, along with at least 500 s.c.f. of hydrogen per barrel of feed, with a sulfur-resistant hydrogenation catalyst. Any of the known sulfactive hydrogenation catalysts may be used in the hydrofining pretreatment. The preferred catalysts have as their main active ingredient one or more oxides or sulfides of the transition metals, such as cobalt, molybdenum, nickel and tungsten. These various materials may be used in a variety of combinations with or without such stabilizers and promoters as the oxides and carbonates of K, Ag, Be, Cu, Mg, Ca, Sr, Ba, Ce, Bi, Cr, Th, Si, Al and Zr. These various catalysts may be unsupported or disposed on various conventional supporting materials, for example charcoal, fuller's earth, kieselguhr, silica gel, alumina, bauxite and magnesia. While any of the noted classes of conventional sulfactive hydrogenation catalysts may be employed, it has been found that particularly desirable catalysts are: (1) a molybdenum oxide catalyst promoted by a minor amount of cobalt oxide and supported upon an activated alumina; (2) tungsten sulfide on activated alumina; and (3) a molybdenum sulfide catalyst promoted by a minor amount of nickel sulfide supported on activated alumina. The catalyst may be in the form of fragments or formed pieces, such as pellets, extrudates and cast pieces of any suitable form or shape.

An effective hydrofining catalyst comprises cobalt impregnated on a coprecipitated molybdena-alumina (e.g., prepared in accordance with the disclosures of U.S. Patent 2,432,286 to Claussen et al., or U.S. Patent 2,697,006 to Sieg), combined with cobalt oxide, the final catalyst having a metals content equivalent to about 2% cobalt and 7% molybdenum.

Operable hydrofining conditions are temperatures of 700° to 800° F., pressures of 200 to 3000 p.s.i.g., space velocities of 0.5 to 3.0, and 1000 to 15,000 s.c.f. of hydrogen per barrel of hydrocarbon feed.

*Construction and operation*

Referring now to the drawing, there is shown a sectional elevation view of a hydrocarbon conversion reactor embodying the apparatus of the present invention and suitable for use in carrying out the process of the present invention. The reactor illustrated comprises a chrome steel shell 1 containing, for example, 2¼ weight percent chrome and 1 weight percent molybdenum, and an inner stainless steel liner 2 containing, for example, 18 weight percent chrome and 8 weight percent nickel, and so disposed within shell 1 as to provide an annular space 3. Reactor shell 1 is fitted, as shown, with a hydrocarbon inlet 4 and a reaction mix outlet 5, each communicating as shown with the reaction space or interior of liner 2. Liner 2 is secured by suitable means, for example by welding, at the lower end thereof to prevent movement of the lower end thereof with respect to shell 1. Ring member 10, secured to shell 1 apparatus, as a track on which ring member 11, secured to liner 2, may travel during the upward and downward movement of the upper portions of liner 2 in response to thermally-induced expansion and contraction effects. Ring members 10 and 11 accordingly co-act to form a sliding joint.

Catalyst support trays 12, 13 and 14 are attached to the interior walls of liner 2 so that the entire load of the catalyst supported on said trays to the heights shown by lines 20, 21 and 22, respectively, is carried by liner 2, as are the other liner internals shown.

The arrangement of reactor internals shown is an arrangement that is satisfactory, for purposes of illustrating the present invention, in connection with a hydrodenitrification process of the type previously discussed. In such a process, the nitrogen-containing hydrocarbon feed, together with hydrogen, is passed through reactor inlet 4 into space 23, thence through basket screens 24, which serve to screen out fine solids and distribute the feed, thence through pipes 25 into contact with the catalyst mass located on support grid 12. Pipes 25 are located on tray 26, having perforations coinciding with the vertical holes in pipes 25. Reaction vapors pass longitudinally through pipes 25, while liquids collect on tray 26 which rise to the height of the holes 27, flow through holes 27 into pipes 25.

Reaction mix passed through support grid 12 and thence through a further reactor internal including quench trays and additional downcomer trays 24 and pipes 25 located on tray 30 to a second catalyst bed located on support grid 13. Reaction mix from said second catalyst bed in turn passes through further reactor internals, including quench trays and additional downcomer trays 24 and pipes 25 located on tray 31 to a third catalyst bed located on support grid 14. From said third catalyst bed, reaction mix, including ammonia formed from the hydrodenitrification reaction, passes out of the reactor through reactor outlet 5.

Thermocouples 35 are installed in the catalyst beds as shown and extend upwardly through tubes 36 to measuring instruments located outside of the reactor. A pipe 37 may be installed as shown for the purpose of introducing quench gas between one or more sets of catalyst beds. Conduit 38 is provided for as a sample connection for the purpose of obtaining samples from time to time, if desired, of the gas in the annular space 3.

A fluid which is substantially non-corrosive to the reactor shell materials under the conditions under which it is used, and which may be a liquid, a gas, or a liquid-gas mixture, is used as a purge. While the fluid acts to purge from annular space 41 any corrosive gases that have leaked into said space, its primary purpose is to prevent such corrosive gases from entering said space. Preferably, the purge fluid will be hydrogen sulfide-free hydrogen, a hydrocarbon gas such as butane, nitrogen or other non-corrosive gas, or a mixture of the foregoing. During reactor operation, this purge fluid is continuously passed through conduit 40 into annular space 41 and thence through a plurality of orifices 42 into annular space 3, thence upwardly in annular space 3, at a pressure and velocity at least sufficient to prevent entry of corrosive gases from the interior of liner 2 into annular space 3. From annular space 3, the purge fluid is passed through liner 2 via orifices 50 in ring member 10 and via the clearance spaces between liner 2 and the various thermocouple and quench pipes entering liner 2, into contact with incoming hydrocarbon and hydrogen feed.

From the foregoing, it may be seen that, with the apparatus and process of the present invention, corrosive attack on the reactor shell 1 may be combatted much more efficiently than by the use of such expedients as internal insulation, internal shell cladding, etc. Additional advantages include utilization of the purge fluid in the reaction mix as a reaction component upon completion of the purging operation. Further efficiencies can be obtained by such expedients as using catalytic reformer off-gas as at least a part of the purge fluid, and by using at least a portion of the make-up hydrogen to the system as at least a portion of the purge fluid.

Although only specific modes of operation of the apparatus and process of the present invention have been described, numerous variations could be made in these modes without departing from the spirit of the invention, and all such variations that fall within the scope of the appended claims are intended to be embraced thereby.

We claim:

1. The method of preventing attack by corrosive vapors on the interior of the shell of a reactor, said reactor comprising an elongated reactor shell and a continuous, elongated metal inner liner forming a reaction zone and so located within said shell as to provide an elongated annulus completely surrounding the entire outer vertical surface of said liner between said shell and said liner, said reactor further comprising a hydrocarbon inlet at an upper portion of said shell communicating with said reaction zone and a reaction mix outlet at a lower portion of said shell communicating with said reaction zone, said method comprising continuously during reactor operation passing a non-corrosive purge fluid into said annulus, thence through at least a substantial portion of said annulus, and thence from said annulus into contact with the incoming reactor feed components.

2. A process as in claim 1, wherein said purge fluid is a gas selected from the group consisting of hydrogen and nitrogen.

3. A process as in claim 1, wherein the pressure in said annulus is maintained substantially higher than the pressure in the interior of said liner.

4. A process as in claim 1, wherein said purge fluid, upon being introduced into said annulus, is uniformly distributed in said annulus.

5. A hydrocarbon conversion reactor comprising an elongated reactor shell and a continuous, elongated metal inner shell liner forming a reaction zone and positioned in said reactor shell to provide an annular space between said shell and said liner completely surrounding the entire outer vertical surface of said liner, said liner having the lower end thereof secured with respect to the lower end of said shell and having the remaining portions thereof unsecured and free to move with respect to said shell in response to thermally-induced expansion and contraction, said shell having at an upper portion thereof a hydrocarbon inlet communicating with said reaction zone and having at a lower portion thereof a reaction mix outlet also communicating with said reaction zone, purge gas inlet means in the lower portion of said reactor for passing a purge gas into said annular space and upwardly therethrough, and purge gas outlet means communicating with the interior of said liner in the upper portion of said reactor for passing said purge gas and corrosive compounds from said annular space into the upper portion of said reaction zone.

6. In a hydrocarbon conversion reactor comprising an elongated reactor shell and a continuous, elongated metal inner liner forming a reaction zone and so located within said shell as to provide an elongated annulus between said shell and said liner completely surrounding the entire outer vertical surface of said liner, the improvement for preventing attack on the interior of said shell by corrosive gases during operation of said reactor which comprises means in the lower portion of said reactor for continuously during said operation passing a non-corrosive purge fluid into and longitudinally through substantially all of said annulus, and means in the upper portion of said reactor for directing said purge fluid out of said annulus and into the upper portion of said reaction zone.

References Cited by the Examiner
UNITED STATES PATENTS

| Re. 23,945 | 2/55 | Shabaker | 208—165 |
| 2,338,345 | 1/44 | Mather | 23—288 |
| 2,621,105 | 12/52 | Beaver et al. | 208—47 |
| 2,981,677 | 4/61 | Bowes | 208—146 |
| 3,043,651 | 8/62 | Pretsch | 23—288.92 |

ALPHONSO D. SULLIVAN, *Primary Examiner.*

JOSEPH R. LIBERMAN, *Examiner.*